United States Patent [19]
Song et al.

[11] Patent Number: 5,227,182
[45] Date of Patent: Jul. 13, 1993

[54] METHOD OF CONTROLLING RELEASE OF SUCRALOSE IN CHEWING GUM USING CELLULOSE DERIVATIVES AND GUM PRODUCED THEREBY

[75] Inventors: Joo H. Song, Northbrook; David W. Record, River Forest; Kevin B. Broderick, Berwyn; Christafor E. Sundstrom, Glen Ellyn, all of Ill.

[73] Assignee: Wm. Wrigley Jr. Company, Chicago, Ill.

[21] Appl. No.: 844,719

[22] Filed: Mar. 2, 1992

Related U.S. Application Data

[63] Continuation-in-part of Ser. No. 721,616, filed as PCT/US90/06833 on Nov. 21, 1990, Pat. No. 5,139,798.

[51] Int. Cl.$^5$ ............................................. A23G 3/30
[52] U.S. Cl. ..................................... 426/5; 426/548; 426/804
[58] Field of Search ................................ 426/3-6, 426/548, 804

[56] References Cited

U.S. PATENT DOCUMENTS

| | | | |
|---|---|---|---|
| 4,885,175 | 12/1989 | Zibell | 426/5 |
| 4,919,941 | 4/1990 | Zibell | 426/5 |
| 4,933,190 | 6/1990 | Cherukuri et al. | 426/5 |
| 4,971,797 | 11/1990 | Cherukuri et al. | 424/440 |
| 4,978,537 | 12/1990 | Song | 426/5 |
| 4,986,991 | 1/1991 | Yatka et al. | 426/3 |
| 5,077,053 | 12/1991 | Kuncewitch et al. | 424/441 |
| 5,124,160 | 6/1992 | Zibell et al. | 426/5 |
| 5,139,798 | 8/1992 | Yatka et al. | 426/5 |
| 5,153,011 | 10/1992 | Patel et al. | 426/5 |

FOREIGN PATENT DOCUMENTS

| | | |
|---|---|---|
| 0267809 | 5/1988 | European Pat. Off. |
| 0320522 | 6/1989 | European Pat. Off. |
| 0320523 | 6/1989 | European Pat. Off. |
| 0375122 | 6/1990 | European Pat. Off. |
| 0422820 | 4/1991 | European Pat. Off. |
| 0434321 | 6/1991 | European Pat. Off. |
| 0454287 | 10/1991 | European Pat. Off. |
| WO88/08672 | 11/1988 | PCT Int'l Appl. |
| WO90/07859 | 7/1990 | PCT Int'l Appl. |
| WO91/07102 | 5/1991 | PCT Int'l Appl. |
| WO91/07103 | 5/1991 | PCT Int'l Appl. |
| WO91/07104 | 5/1991 | PCT Int'l Appl. |

*Primary Examiner*—Jeanette Hunter
*Attorney, Agent, or Firm*—Willian Brinks Olds Hofer Gilson & Lione

[57] ABSTRACT

The present invention is a method for producing a chewing gum with a delayed release sucralose sweetener, as well as the chewing gum so produced. The delayed release sucralose sweetener is obtained by physically modifying sucralose's properties by coating and drying. Sucralose sweetener is dissolved in a solvent and coated onto a cellulose derivative such as hydroxypropyl cellulose by agglomerating the cellulose derivative with the sucralose solution. The agglomerated material preferably includes an absorption material such as silica. The agglomerated sweetener is then dried and preferably particle sized to produce a release-modified sucralose high-intensity sweetener. When incorporated into the chewing gum, these particles are adapted to enhance the shelf stability of the sweetener and/or produce a delayed release when the gum is chewed.

19 Claims, 3 Drawing Sheets

METHOD OF CONTROLLING RELEASE OF SUCRALOSE IN CHEWING GUM USING CELLULOSE DERIVATIVES AND GUM PRODUCED THEREBY

CROSS REFERENCE TO RELATED APPLICATIONS

This application is a continuation-in-part of application Ser. No. 721,616 filed as PCT/US90/06833 filed Nov. 21, 1990, nationalized as U.S. patent application Ser. No. 07/721,616 on Jul. 17, 1991, now U.S. Pat. No. 5,139,798, incorporated herein by reference, which in turn was a continuation-in-part of application Ser. No. PCT/US89/05296, filed Nov. 22, 1989 now abandoned and titled Method of Controlling Release of Sucralose in Chewing Gum and Gum Produced Thereby, also incorporated herein by reference.

FIELD OF THE INVENTION

The present invention relates to chewing gum, and more particularly to the use of sucralose agglomerated with cellulose derivatives in chewing gum.

BACKGROUND OF THE INVENTION

In recent years, efforts have been devoted to controlling release characteristics of various ingredients in chewing gum. Most notably, attempts have been made to delay the release of sweeteners and flavors in various chewing gum formulations to thereby lengthen the satisfactory chewing time of the gum. Delaying the release of sweeteners and flavors can also avoid an undesirable overpowering burst of sweetness or flavor during the initial chewing period. On the other hand, some ingredients have been treated so as to increase their rate of release in chewing gum.

In addition, other efforts have been directed at perfecting the use of high-potency sweeteners within the chewing gum formulation, to thereby increase the shelf-life stability of the ingredients, i.e. the protection against degradation of the high-potency sweetener over time.

One such high-potency sweetener is sucralose. This high-potency sweetener gives chewing gum a fast, strong release that is not desirable. Methods of treating the high-potency sweetener to delay the release of sweetness in balance with the chewing gum flavor would therefore be a definite improvement.

The use of sucralose as an artificial sweetener was disclosed in U.S. Pat. No. 4,343,934 and U.K. Patent Nos. 2,065,646 and 2,065,648. Combinations of sucralose with aspartame were disclosed in U.K. Patent No. 2,153,651.

The use of sucralose in chewing gum has been disclosed in other patents.

U.S. Pat. No. 4,495,170 discloses sweetener mixtures for use in foods, beverages and pharmaceuticals. The mixtures are of sucralose and aspartame, saccharin, and acesulfame K. U.S. Pat. No. 4,389,394 discloses the use of chlorodeoxysucrose derivatives in chewing gum to prevent dental caries. Chlorinated sucrose derivatives and their use in food stuffs, including chewing gum, are disclosed in U.S. Pat. Nos. 4,435,440; 4,549,013; and 4,612,373.

U.K. Patent No. 2,154,850 discloses beverages sweetened with sucralose and cyclamate (among others).

U.K. Patent No. 2,185,674 discloses combinations of thaumatin and sucralose (among others) to stimulate growth of farm animals.

U.S. Pat. No. 4,820,528 discloses co-dried sucralose and acid saccharin to prolong sweetness release in chewing gum.

Other patents disclose how a sweetener like aspartame can be physically modified to stabilize and/or control the release rate of the sweetener in chewing gum.

U.S. Pat. No. 4,978,537 and EPO Publication 0 422 820 disclose the use of polyvinyl acetate in fiber spinning techniques to provide for the gradual release of an active agent such as sucralose for use in chewing gum.

U.S. Pat. No. 4,885,175 discloses wax granulation of active ingredients such as sucralose for use in chewing gum.

U.S. Pat. No. 4,919,941 discloses a chewing gum containing a delayed release protein sweetener and method for preparing the same.

European Patent Publication No. 0 434 321 discloses an encapsulated sweetener delivery system comprising a high intensity sweetener, such as chloro derivatives of sucrose, coated in a hydrophobic inner coating and a hydrophilic polymer as an outer coating. Some suggested outer coatings include cellulose and derivatives thereof.

European Patent Publication No. 0 267 809 discloses a sweetening composition composed of sucralose combined with a water soluble stabilizing agent such as maltodextrin.

U.S. Pat. No. 4,933,190 discloses chewing gum with enhanced sweetness using a sweetener, such as chloro derivatives of sucrose, encapsulated in an emulsifier/polyvinyl acetate system and coated with a hydrophillic coating selected from a group consisting of cellulose and derivatives thereof.

U.S. Pat. No. 4,971,797 and European Patent Publication No. 0 375 122 disclose a thermally stabilized sucralose composition made by cocrystallizing sucralose with cyclodextrin.

U.S. Pat. No. 4,597,970 to Sharma et al. teaches a process for producing an agglomerated sweetener wherein the sweetener is dispersed in a hydrophobic matrix consisting essentially of lecithin, a glyceride, and a fatty acid or wax having a melting point between 25° and 100° C. The method disclosed uses a spray-congealing step to form the sweetener-containing matrix into droplets, followed by a fluid-bed second coating on the agglomerated particles.

U.S. Pat. Nos. 4,515,769 and 4,386,106, both to Merrit et al., teach a two step process for preparing a delayed release flavorant for chewing gum. In this process, the flavorant is prepared in an emulsion with a hydrophilic matrix. The emulsion is dried and ground and the particles are then coated with a water-impermeable substance.

U.S. Pat. No. 4,230,687 to Sair et al. teaches a process for encasing an active ingredient to achieve gradual release of the ingredient in a product such as chewing gum. The method described involves adding the ingredient to an encapsulating material in the form of a viscous paste. High-shear mixing is used to achieve a homogeneous dispersion of the ingredient within the matrix, which is subsequently dried and ground.

U.S. Pat. No. 4,139,639 to Bahoshy et al. teaches a process of "fixing" aspartame by co-drying (by spray drying or fluid-bed coating) a solution containing aspartame and an encapsulating agent, such as gum arabic, to thereby surround and protect the aspartame in the gum during storage.

U.S. Pat. No. 4,384,004 to Cea et al. teaches a method of encapsulating aspartame with various solutions of encapsulating agents, including cellulose derivatives, using various encapsulation techniques, such as spray drying, in order to increase the shelf-stability of the aspartame. U.S. Pat. No. 4,634,593 to Stroz et al. teaches a method for producing controlled release sweeteners for confections, such as chewing gum. The method taught therein involves the use of an insoluble fat material which is mix mulled with the sweetener.

SUMMARY OF INVENTION

The present invention is a method for producing chewing gum with a delayed release high-potency sweetener, specifically sucralose, as well as the chewing gum so produced. The delayed release sucralose is obtained by dissolving the sucralose in a solvent and modifying the sucralose by agglomeration with a cellulose derivative, such as hydroxypropyl cellulose. Preferably an absorbent material is present with the cellulose derivative during the agglomeration. The agglomerated material is then dried and added to a gum formulation to provide a sucralose content in the gum of between about 0.01% and about 1%.

This sucralose, when modified according to the present invention, gives a chewing gum having a controlled-release sweetener. A higher quantity of sweetener can be used without resulting in a high initial sweetness impact, but instead having a delayed sweetness release that is compatible with the delayed flavor release in chewing gum, giving a highly consumer-acceptable chewing gum product. The sucralose is also kept more thermally stable by agglomerating it with the cellulose derivative and absorbent material.

DETAILED DESCRIPTION OF THE PREFERRED EMBODIMENTS

Figure 1:
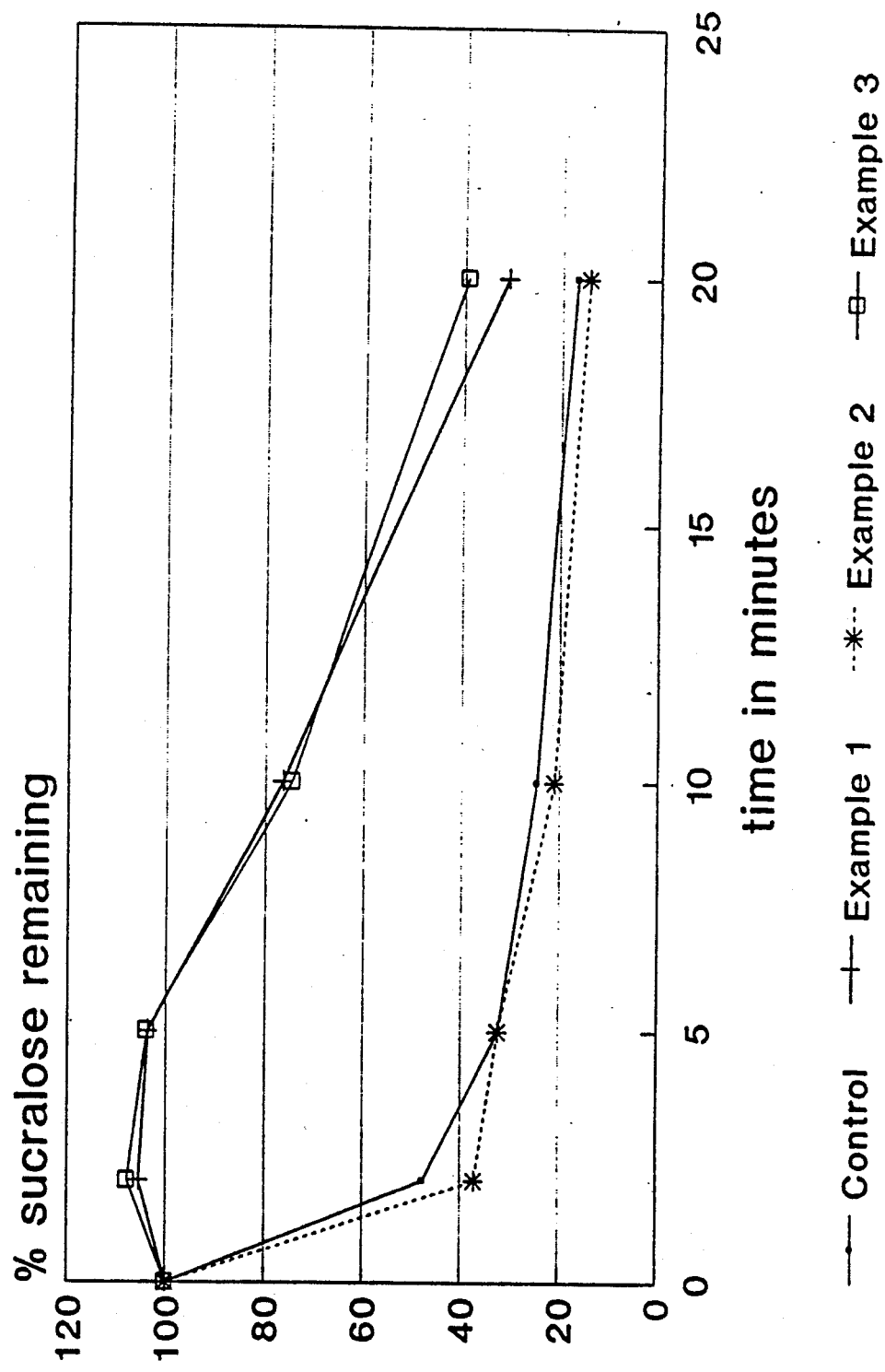
FIGS. 1 and 2 are graphs each showing the release rate of three samples of sucralose agglomerated in accordance with the present invention as compared to a control.

Chewing gums comprise many ingredients, including sweeteners. Sweeteners suitable for chewing gums include both natural and artificial sweeteners.

High-intensity sweeteners may be hundreds of times sweeter than natural sweeteners such as sucrose and glucose. High-intensity sweeteners of recent interest include aspartame, acesulfame K, cyclamates, saccharin, and now sucralose. Sucralose is a new, high-intensity sweetener which is a tri-chlorinated sucrose derivative and is about 400–800 times sweeter than sucrose. Sucralose has been reported to be cheaper than aspartame and at least 3 times sweeter. Compared to some other high-intensity sweeteners, sucralose has a sweet taste more similar to sucrose. Chemically, sucralose is known as 4,1',6'-trichloro4,1', 6'-trideoxy-galactosucrose, or alternatively 1,6-dichloro-1,6'-dideoxy-($\beta$)-D-fructofuranosyl 4-chloro-4-deoxy-($\alpha$)-D-galactopyranoside.

The United States Food and Drug Administration is now considering sucralose as a food additive. The manufacturer of sucralose is Tate & Lyle, Inc. in the U.K. Sucralose is marketed in the United States by McNeil Specialty Products Co., Skillman, N.J.

When sucralose is added to chewing gum at a level of about 0.01% to 0.25%, the sweetener gives chewing gum a fast, intense sweetness that dissipates quickly, leaving a strong flavor character that is less pleasant. It would be considered a significant improvement to a chewing gum to have the sucralose sweetener release its sweetness as the flavor in the gum is released, thus balancing the overall taste perception.

Sucralose may be provided initially as a powder, which is then dissolved in a solvent, or may be provided as a solution to begin with. Preferably the sucralose will be prepared as an aqueous solution.

Usage levels of sucralose in water or other solvents is limited to its solubility in the solvent. For sucralose, solubility in water at 20° C. is approximately 26% (w/w) and increases with temperature. In most other solvents, like glycerine or propylene glycol, the solubility of sucralose is less. Sucralose is also highly soluble in ethanol and methanol. Whether as a powder or dissolved in liquid, the amount of sucralose added to chewing gum of the present invention is about 0.01% to about 1%. Preferably the range of sucralose in gum is about 0.01% to about 0.25%.

As stated previously, sucralose releases very quickly from chewing gum during the early stages of mastication of the gum because of its high solubility in water. Physical modifications of the sweetener by agglomeration and/or absorption with another substrate will slow its release in chewing gum by reducing the solubility or dissolution rate of sucralose.

The agglomeration techniques here described are standard agglomerating techniques and generally give varying degrees of coating from partial to full coating, depending on the agglomerating composition used in the process. The agglomerating compositions of the present invention include cellulose derivatives like hydroxypropyl cellulose, ethyl cellulose, methyl cellulose, sodium hydroxymethyl cellulose and hydroxypropylmethyl cellulose. Dextrin, gelatin, and modified starches may also be used. These ingredients, which are generally approved for food use, give a delayed release when used as an agglomerating agent with sucralose.

The amount of agglomerating material combined with the sucralose sweetener also controls the length of time for its release from chewing gum. Generally, the higher the level of agglomerating agent and the lower the amount of active sucralose, the slower the release of the sweetener during mastication. The release rate is generally not instantaneous, but gradual over an extended period of time. To obtain the desired sweetness release to blend with a gum's flavor release, the agglomerating agent should be a minimum of about 20% of the agglomerated sweetener. Preferably, the agglomerating agent should be a minimum of about 30% of the agglomerated sweetener, and most preferably should be a minimum of about 40% of the agglomerated sweetener. Depending on the agglomerating material, a higher or lower amount of agglomerating material may be needed to give the desired release of sweetener to balance sweetness release with flavor release.

The agglomerating method includes the step of mixing the sweetener (dissolved in a small amount of water or other solvent) with the agglomerating material. The mixture is prepared in such a way as to have the sweetener solution in contact with the agglomerating material so that a partial coating can be applied. After the water or solvent is removed, the mixture is ground and used as a powdered, agglomerated sweetener.

In the preferred embodiment of this invention, a porous, absorbent material is first mixed with the agglomerating agent. The absorbent material and agglomerating agent can be dry blended, or provided in other forms. In one preferred embodiment of the invention, the agglomerating agent and absorbent material are first mixed and extruded together. Preferably both the agglomerating agent and absorbent are in a powder form. The materials are weighed out separately and then mixed together, such as by being put into a lined, fiber drum and tumbled to mix the powders. The mixture is then fed into an extruder which heats the material, melting the agglomerating agent. As the material exits the extruder, or afterwards, it is granulated.

The sucralose sweetener may then be absorbed onto the combined agglomerating/absorbent material and become entrapped in the matrix of the absorbent component. Common materials used for absorbing the sweetener include, but are not limited to, silicas, silicates, maltodextrin, clays, spongelike beads or microbeads, amorphous sugars like spray-dried dextrose, sucrose, alditols, amorphous carbonates and hydroxides, including aluminum and calcium lakes, vegetable gums and other spray dried materials.

Depending on the type of absorbent material and how it is prepared, the amount of sucralose sweetener that can be loaded onto the absorbent will vary. Generally materials like polymers or spongelike beads or microbeads, amorphous sugars and alditols and amorphous carbonates and hydroxides absorb about 10% to about 40% of the weight of the absorbent. Materials like silicas and pharmasorb clays may be able to absorb about 20% to about 80% of the weight of the absorbent.

The general procedure for using the absorbent is as follows. An absorbent like fumed silica powder can be mixed in a powder blender with the agglomerating agent before it is mixed with a solution of the sucralose sweetener. The solution can be sprayed onto the powder as mixing continues. The solution can be about 5% to 25% sucralose solids, and higher solid levels may be used if temperatures up to 90° C. are used. Generally water is the solvent, but other solvents like alcohol could also be used if approved for use in food. As the powder mixes, the liquid is sprayed onto the powder. Spraying is stopped before the mix becomes damp. The still free-flowing powder is removed from the mixer and dried to remove the water or other solvent, and ground to a specific particle size.

The preferred method of use to obtain a delayed release of sucralose sweetener is in a material containing a mixture of hydroxypropyl cellulose and silica.

The agglomerated high-potency sweetener may readily be incorporated into a chewing gum composition. The remainder of the chewing gum ingredients are non-critical to the present invention. That is, the agglomerated particles of high-potency sweetener can be incorporated into conventional chewing gum formulations in a conventional manner. Naturally, the preferred chewing gum formulation is a sugarless chewing gum. However, the high-potency sweeteners may also be used in a sugar chewing gum to intensify and/or extend the sweetness thereof. The agglomerated high-potency sweetener may be used in either regular chewing gum or bubble gum.

In general, a chewing gum composition typically comprises a water-soluble bulk portion, a water-insoluble chewable gum base portion and typically water-insoluble flavoring agents. The water-soluble portion dissipates with a portion of the flavoring agent over a period of time during chewing. The gum base portion is retained in the mouth throughout the chew.

The insoluble gum base generally comprises elastomers, resins, fats and oils, waxes, softeners and inorganic fillers. Elastomers may include polyisobutylene, isobutylene-isoprene copolymer and styrene butadiene rubber, as well as natural latexes such as chicle. Resins include polyvinylacetate and terpene resins. Fats and oils may also be included in the gum base, including tallow, hydrogenated and partially hydrogenated vegetable oils, and cocoa butter. Commonly employed waxes include paraffin, microcrystalline and natural waxes such as beeswax and carnauba. According to the preferred embodiment of the present invention, the insoluble gum base constitutes between about 5 to about 95 percent by weight of the gum. More preferably the insoluble gum base comprises between 10 and 50 percent by weight of the gum and most preferably about 20 to about 35 percent by weight of the gum.

The gum base typically also includes a filler component. The filler component may be calcium carbonate, magnesium carbonate, talc, dicalcium phosphate or the like. The filler may constitute between about 5 and about 60 percent by weight of the gum base. Preferably, the filler comprises about 5 to about 50 percent by weight of the gum base.

Gum bases typically also contain softeners, including glycerol monostearate and glycerol triacetate. Further, gum bases may also contain optional ingredients such as antioxidants, colors, and emulsifiers. The present invention contemplates employing any commercially acceptable gum base.

The water-soluble portion of the chewing gum may further comprise softeners, sweeteners, flavoring agents and combinations thereof. The sweeteners often fulfill the roll of bulking agents in the gum. Preferably the sweeteners will be sugarless sweeteners such as sorbitol, mannitol, xylitol, hydrogenated starch hydrolysates, maltitol and the like, alone or in any combination. The bulking agent generally will comprise from about 5 percent to about 90 percent of the gum composition, and more preferably about 20 percent to about 70 percent of the gum composition.

Softeners are added to the chewing gum in order to optimize the chewability and mouth feel of the gum. Softeners, also known in the art as plasticizers or plasticizing agents, generally constitute between about 0.5 to about 15.0 percent by weight of the chewing gum. Softeners contemplated by the present invention include glycerin, lecithin, and combinations thereof. Further, aqueous sweetener solutions such as those containing sorbitol, hydrogenated starch hydrolysates, corn syrup and combinations thereof may be used as softeners and binding agents in gum.

As mentioned above, the agglomerated high-potency sweeteners of the present invention will most likely be used in sugarless gum formulations. However, formulations containing sugar as the bulking agent are also within the scope of the invention. Sugar sweeteners generally include saccharide-containing components commonly known in the chewing gum art which comprise, but are not limited to, sucrose, dextrose, maltose, dextrin, dried invert sugar, fructose, levulose, galactose, corn syrup solids and the like, alone or in any combination.

The agglomerated high-potency sweeteners of the present invention can also be used in combination with other sugarless sweeteners. Generally sugarless sweeteners include components with sweetening characteristics but which are devoid of the commonly known sugars and comprise, but are not limited to, sugar alcohols such as sorbitol, mannitol, xylitol, hydrogenated starch hydrolysates, maltitol and the like, alone or in any combination.

Depending on the particular sweetness release profile and shelf-stability needed, the agglomerated high-potency sweeteners of the present invention can also be used in combination with other high-potency sweeteners or with high-potency sweeteners.

A flavoring agent may be present in the chewing gum in an amount within the range of from about 0.1 to about 10.0 weight percent and preferably from about 0.5 to about 3.0 weight percent of the gum. The flavoring agents may comprise essential oils, synthetic flavors, or mixture thereof including, but not limited to, oil derived from plants and fruits such as citrus oils, fruit essences, peppermint oil, spearmint oil, clove oil, oil of wintergreen, anise, and the like. Artificial flavoring components are also contemplated for use in gums of the present invention. Those skilled in the art will recognize that natural and artificial flavoring agents may be combined in any sensorially acceptable blend. All such flavors and flavor blends are contemplated by the present invention.

Optional ingredients such as colors, emulsifiers and pharmaceutical agents may be added to the chewing gum.

In general, chewing gum is manufactured by sequentially adding the various chewing gum ingredients to a commercially available mixer known in the art. After the ingredients have been thoroughly mixed, the gum mass is discharged from the mixer and shaped into the desired form such as by rolling into sheets and cutting into sticks, extruding into chunks or casting into pellets.

Generally, the ingredients are mixed by first melting the gum base and adding it to the running mixer. The base may also be melted in the mixer itself. Color or emulsifiers may also be added at this time. A softener such as glycerin may also be added at this time, along with syrup and a portion of the bulking agent. Further portions of the bulking agent may then be added to the mixer. A flavoring agent is typically added with the final portion of the bulking agent. The agglomerated sweetener of the present invention is preferably added after the final portion of bulking agent and flavor have been added.

The entire mixing procedure typically takes from five to fifteen minutes, but longer mixing times may sometimes be required. Those skilled in the art will recognize that many variations of the above described procedure may be followed.

EXAMPLES

The following examples of the invention and comparative examples are provided by way of explanation and illustration.

Sucralose, obtained from McNeil Specialties, was put into an aqueous solution and agglomerated onto either hydroxypropyl cellulose (HPC), silica or combined HPC/silica and dried in a convection oven at 105° F. for 16 hours. The HPC, commercially known as Klucel, was obtained from Aqualon, P.O. Box 15417, Wilmington, Del., 19850. Two types of HPC were used: type HF, having a molecular weight of about 1,150,000, and type GF, having a molecular weight of about 370,000. The silica, commercially known as Sipernat 22, was obtained from Degusa Corp., Allendale, N.J. In the examples where the agglomerating agent and absorbent were extruded together, a Clextral Model BC 45 extruder was used. In Samples 3, 4 and 7 below, the feeder setting on the extruder was set at 25 and the temperatures were as follows: first zone - 84° C., second zone - 143° C., third zone - 231° C., fourth zone - 231° C. For Example 6, the feeder speed setting was at 21 and the temperatures were as follows: first zone - 21° C., second zone - 141° C., third zone - 221° C., fourth zone - 222° C. In each instance a four-hole, 3 mm die was used.

The samples were made using the following sucralose solution concentrations and levels of HPC and silica:

Sample 1
37.6 grams of 25% sucralose solution
40.0 grams of HPC HF

The sucralose solution was agglomerated with the HPC HF powder by spraying the solution onto the powder a little at a time with mixing. The dried product was ground in a Fitz hammer mill grinder.

Sample 2
39.0 grams of 25% sucralose solution
40.0 grams of silica

The sucralose solution was sprayed a little at a time onto the silica powder and mixed. The sucralose solution was absorbed and agglomerated, then dried.

Sample 3
38.7 grams of 25% sucralose solution
40.0 grams of 60/40% HPC HF/silica The HPC HF and silica powders were extruded together. The extrudate was then cooled and ground. Sucralose solution was sprayed a little at a time onto the dry extrudate as it was mixed. After the agglomerated product was dried, it was ground again.

Sample 4
5.3 grams of 5% sucralose solution
25.0 grams of 60/40% HPC HF/silica
7.8 grams of water This example also used the HPC/silica extrudate. The sucralose solution was agglomerated with the HPC/silica extrudate and water was added to the agglomerated product to finish the agglomeration/absorption process. This sample used the same procedure as Sample 3 except for the addition of water. The same type of product was achieved, only there was less sucralose.

Sample 5
94 g of 25% sucralose solution
60 g HPC HF
40 g silica

A dry blend of HPC HF and silica was made. The sucralose solution was then agglomerated with the dry blend material. After drying, the agglomerated material was ground.

Sample 6
23.6 grams of 19% sucralose solution
25.0 grams of 60/40% HPC GF/silica The sucralose solution was agglomerated with an extrudate of HPC GF and silica. The sucralose solution was sprayed a little at a time onto the extrudate and mixed. The agglomerated material was then dried and ground. This is the same procedure used in Sample 3. The major difference between Samples 3 and 6 was the type of HPC. The sucralose solution composition and ratio of solution to extrudate were also slightly different.

Sample 7

10 grams of 25% sucralose solution
30 grams of a mixture of 40% silica/60% HPC HF.

The silica and HPC were extruded and mixed with the sucralose solution as in Sample 3.

Samples 1-6 were put into chewing gum. The gum formulas are listed in Table 1 below. The control used a 25% sucralose solution.

TABLE 1

GUM FORMULAS

| Ingredients | Control | EX. 1 | EX. 2 | EX. 3 | EX. 4 | EX. 5 | EX. 6 |
|---|---|---|---|---|---|---|---|
| Base | 22.25 | 22.25 | 22.25 | 22.25 | 22.25 | 22.25 | 22.25 |
| Glycerine | 2.00 | 2.00 | 2.00 | 2.00 | 2.00 | 2.00 | 2.00 |
| Spearmint flavor | 1.35 | 1.35 | 1.35 | 1.35 | 1.35 | 1.35 | 1.35 |
| Dextrose monohydrate | 2.00 | 2.00 | 2.00 | 2.00 | 2.00 | 2.00 | 2.00 |
| Corn syrup | 5.13 | 5.13 | 5.13 | 5.13 | 5.13 | 5.13 | 5.13 |
| Sugar | 64.93 | 64.854 | 64.864 | 64.93 | 63.97 | 64.854 | 64.854 |
| Calcium carbonate | 2.00 | 2.00 | 2.00 | 2.00 | 2.00 | 2.00 | 2.00 |
| 10% aqueous solution of NaCl | 0.10 | 0.10 | 0.10 | 0.10 | 0.10 | 0.10 | 0.10 |
| Agglomerated sucralose | — | 0.316 (Sample 1) | 0.306 (Sample 2) | 0.24 (Sample 3) | 1.20 (Sample 4) | 0.316 (Sample 5) | 0.316 (Sample 6) |
| 25% sucralose solution | 0.24 | | | | | | |

The control and example gum formulas were each chewed for 2, 5, 10 and 20 minutes. The gum was then evaluated by HPLC to determine the amount of sucralose remaining at each time interval. Table 2 contains the amount remaining and a percentage remaining based on the time 0 amount.

TABLE 2

SUCRALOSE CONTENT/TIME (% remaining)

| | Control | EX. 1 | EX. 2 | EX. 3 | EX. 4 | EX. 5 | EX. 6 |
|---|---|---|---|---|---|---|---|
| 0 min. | 0.065 (100%) | 0.055 (100%) | 0.062 (100%) | 0.051 (100%) | 0.060 (100%) | 0.062 (100%) | 0.055 (100%) |
| 2 min. | 0.031 (47.7%) | 0.058 (105.5%) | 0.023 (37.1%) | 0.055 (107.8%) | 0.057 (95%) | 0.046 (74.2%) | 0.053 (96.4%) |
| 5 min. | 0.021 (32.3%) | 0.057 (103.6%) | 0.020 (32.3%) | 0.053 (103.9%) | 0.050 (83.3%) | 0.037 (59.7%) | 0.043 (78.2%) |
| 10 min. | 0.016 (24.6%) | 0.042 (76.4%) | 0.013 (21.0%) | 0.038 (74.5%) | 0.031 (51.7%) | 0.027 (43.5%) | 0.034 (61.8%) |
| 20 min. | 0.011 (16.9%) | 0.017 (30.9%) | 0.009 (14.5%) | 0.020 (39.2%) | 0.007 (11.7%) | 0.008 (12.9%) | 0.017 (30.9%) |

Figure 2:
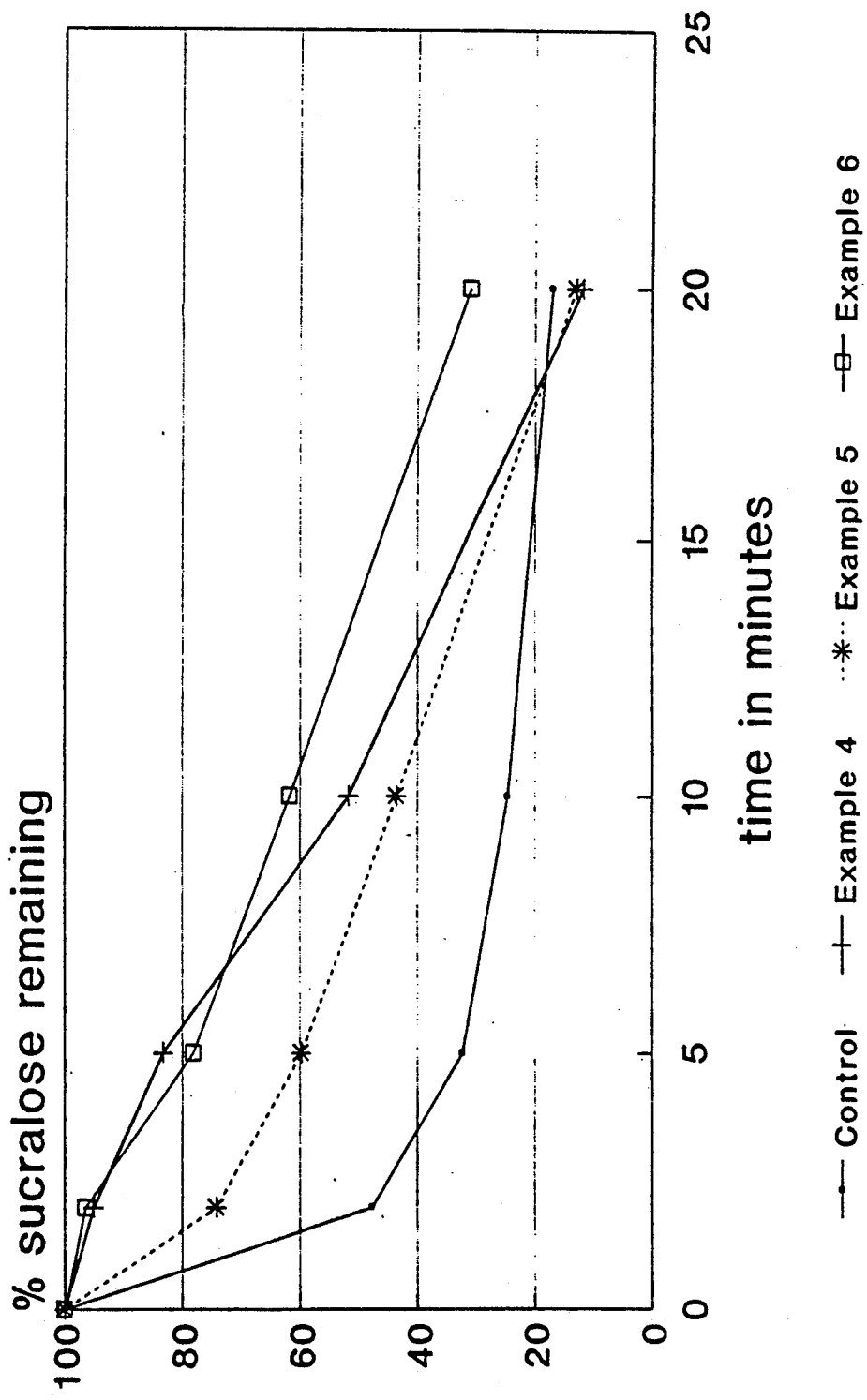

The percentages are graphed in FIG. 1 (Control and Examples 1-3) and FIG. 2 (Control and Examples 4-6) in relation to the time intervals. FIGS. 1 and 2 show that each of the agglomeration methods except Sample 2 produces a definite improvement in the release of sucralose in the gum. Thus, using HPC/silica and HPC alone as agglomerated materials produces a gradual release profile for sucralose.

Figure 3:
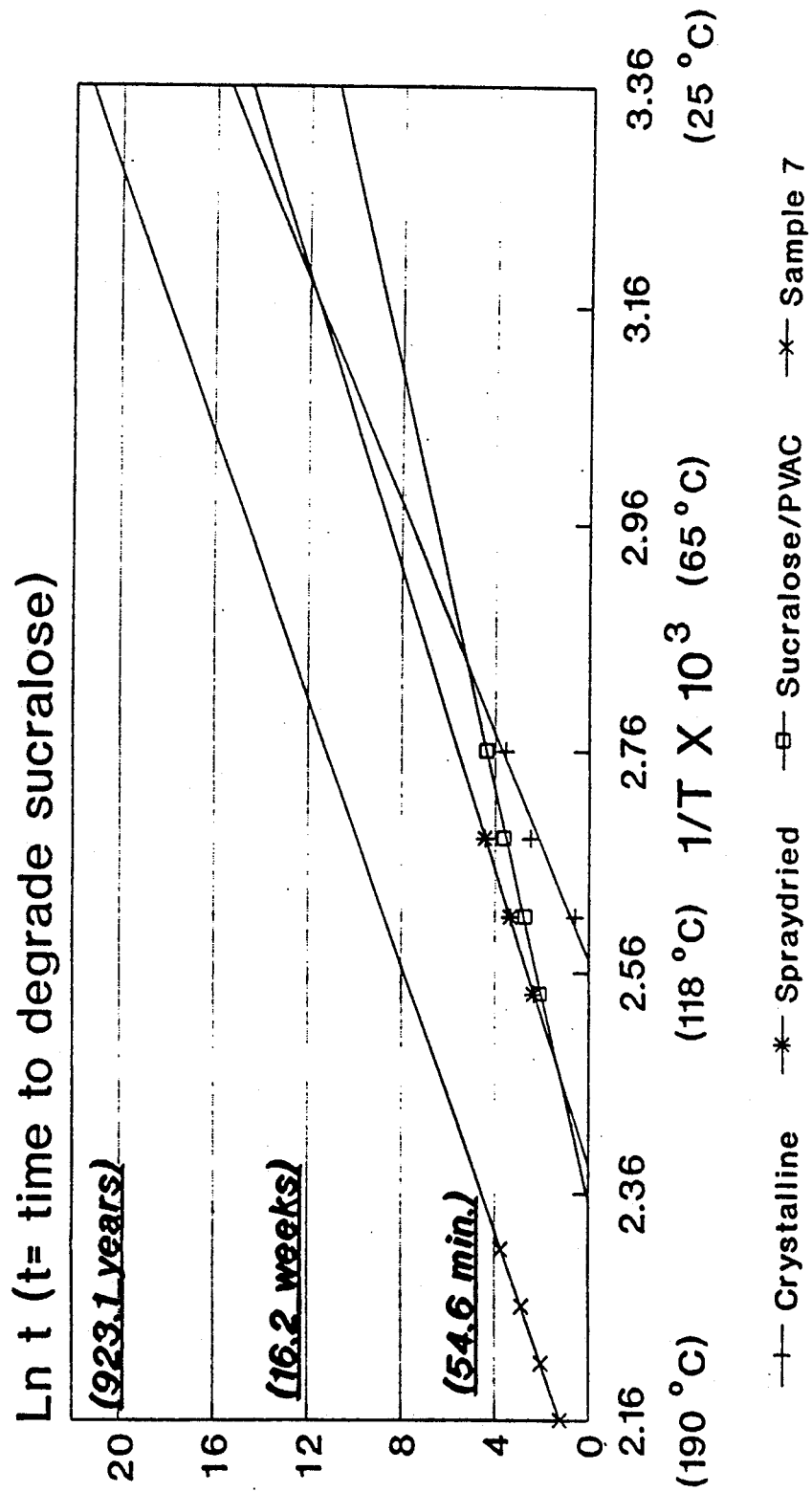
FIG. 3 is a graph showing the stability of sucralose with various treatments, including agglomeration in accordance with the present invention.

Samples of sucralose in four different forms was tested to determine its stability: 1) a sample of the material from Sample 7; 2) crystalline sucralose; 3) spray dried sucralose using 2560 g of 25% aqueous sucralose solution, 640 grams of maltodextrin and 640 grams of water; and 4) a polyvinyl acetate-sucralose composition made with 80% polyvinyl acetate (PVAc) and 20% crystalline sucralose extruded together. These samples were analyzed with a differential scanning calorimeter to determine the amount of time it would take to initially degrade the sucralose at a fixed temperature. The samples were held at four different temperatures until there was a release of energy from the samples signifying degradation. The time it took for each sample to initially release energy (degrade) was recorded. The data was extrapolated to show the behavior of sucralose at lower temperatures. FIG. 3 shows the stability of sucralose in the tested forms.

At all the temperatures represented, the agglomerated sucralose in HPC and silica did not degrade as fast as sucralose in any of its other tested forms. Sucralose is therefore more stable agglomerated with HPC/silica than in its crystalline, spray dried or PVAc encapsulated forms. The thermal stability of the sucralose agglomerated in HPC/silica contributes to its ability to remain intact and give a better release profile.

Many of the agglomeration examples listed are single step processes. However, more delayed release of the sucralose sweetener may be obtained by combining the various processes of agglomeration and absorption with other coating processes. Any of the preparations made in the foregoing examples can be further treated in fluid-bed coating, spray chilling, or coacervation processes to encapsulate the product, and can be agglomerated with various materials and procedures in a variety of multiple step processes.

The sucralose sweetener can also be used with a variety of other high-intensity sweeteners and blended together before agglomeration. Other highpotency sweeteners include thaumatin, monellin, aspartame, salts of acesulfame, saccharin and its salts, glycyrrhizin, alitame, cyclamate and its salts, stevioside and dihydrochalcones.

It should be appreciated that the compositions and methods of the present invention are capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

We claim:

1. A method for producing chewing gum with sucralose comprising the steps of:
   a) mixing a quantity of sucralose solution with a cellulose derivative to form an agglomerate;
   b) drying the sucralose and cellulose derivative agglomerate; and
   c) adding a quantity of the agglomerated sucralose and cellulose derivative to a chewing gum formulation to provide a sucralose level in the gum of from about 0.01% to about 1%.

2. The method of claim 1 wherein the sucralose solution comprises a solvent selected from the group consisting of alcohol and water.

3. The method of claim 1 wherein the cellulose derivative is selected from the group consisting of hydroxypropyl cellulose, ethyl cellulose, methyl cellulose, sodium hydroxymethyl cellulose and hydroxypropylmethyl cellulose.

4. The method of claim 1 wherein an additional high-potency sweetener selected from the group consisting of aspartame, alitame, salts of acesulfame, cyclamate and its salts, saccharin and its salts, thaumatin, monellin, stevioside, glycyrrhizin, dihydrochalcones, and combinations thereof is mixed in the mixture in combination with the sucralose.

5. The method of claim 1 wherein the mixing step comprises spraying the sucralose solution onto a powdered cellulose derivative.

6. The method of claim 1 wherein the agglomerated sucralose and cellulose derivative are added to the gum formulation to provide a sucralose level in the gum of from about 0.01% to about 0.25%.

7. The method of claim 1 wherein the agglomerated sucralose and cellulose derivative are ground prior to being added to the gum formulation.

8. A method for producing chewing gum with sucralose comprising the steps of:
   a) mixing a quantity of sucralose solution with a cellulose derivative and an absorbent material to form an agglomerate;
   b) drying said agglomerate; and
   c) adding a quantity of the dried agglomerated to a chewing gum formulation to provide a sucralose level in the gum formulation of from about 0.01% to about 1%.

9. The method of claim 8 wherein the sucralose solution comprises a solvent selected from the group consisting of alcohol and water.

10. The method of claim 8 wherein the absorbent material is selected from the group consisting of silica, maltodextrin and clays.

11. The method of claim 8 wherein the cellulose derivative is selected from the group consisting of hydroxypropyl cellulose, ethyl cellulose, methyl cellulose, sodium hydroxymethyl cellulose and hydroxypropylmethyl cellulose.

12. The method of claim 8 wherein an additional high-potency sweetener selected from the group consisting of aspartame, alitame, salts of acesulfame, cyclamate and its salts, saccharin and its salts, thaumatin, monellin, stevioside, glycyrrhizin, dihydrochalcones, and combinations thereof is mixed in the mixture in combination with the sucralose.

13. The method of claim 8 wherein the cellulose derivative and the absorbent material are extruded together prior to being agglomerated with the sucralose solution.

14. The method of claim 8 wherein the cellulose derivative and the absorbent material are mixed together in a powder from prior to being agglomerated with the sucralose solution.

15. The method of claim 8 wherein the mixing step comprises spraying the sucralose solution onto a powdered combination of cellulose derivative and absorbent material.

16. The method of claim 8 wherein the agglomerate is added to the gum formulation to provide a sucralose level in the gum of from about 0.01% to about 0.25%.

17. The method of claim 8 wherein the dried agglomerated is ground prior to being added to the gum formulation.

18. A chewing gum made according to the method of claim 1.

19. A chewing gum made according to the method of claim 8.

* * * * *

UNITED STATES PATENT AND TRADEMARK OFFICE
CERTIFICATE OF CORRECTION

PATENT NO. : 5,227,182
DATED : July 13, 1993
INVENTOR(S) : Joo H. Song et al.

It is certified that error appears in the above-indentified patent and that said Letters Patent is hereby corrected as shown below:

In column 7, line 18, delete "or with high-potency sweeteners--.

In column 7, line 24, delete "oil" and substitute therefor --oils--.

Column 11:

In claim 8, line 7, delete "agglomerated" and substitute therefor --agglomerate--.

Column 12:
In claim 14, line 3, delete "from" and substitute therefor --form--.

In claim 17, lines 1 and 2, delete "agglomerated" and substitute therefor --agglomerate--.

Signed and Sealed this

First Day of November, 1994

*Attest:*

BRUCE LEHMAN

*Attesting Officer*   *Commissioner of Patents and Trademarks*